Patented Feb. 3, 1942

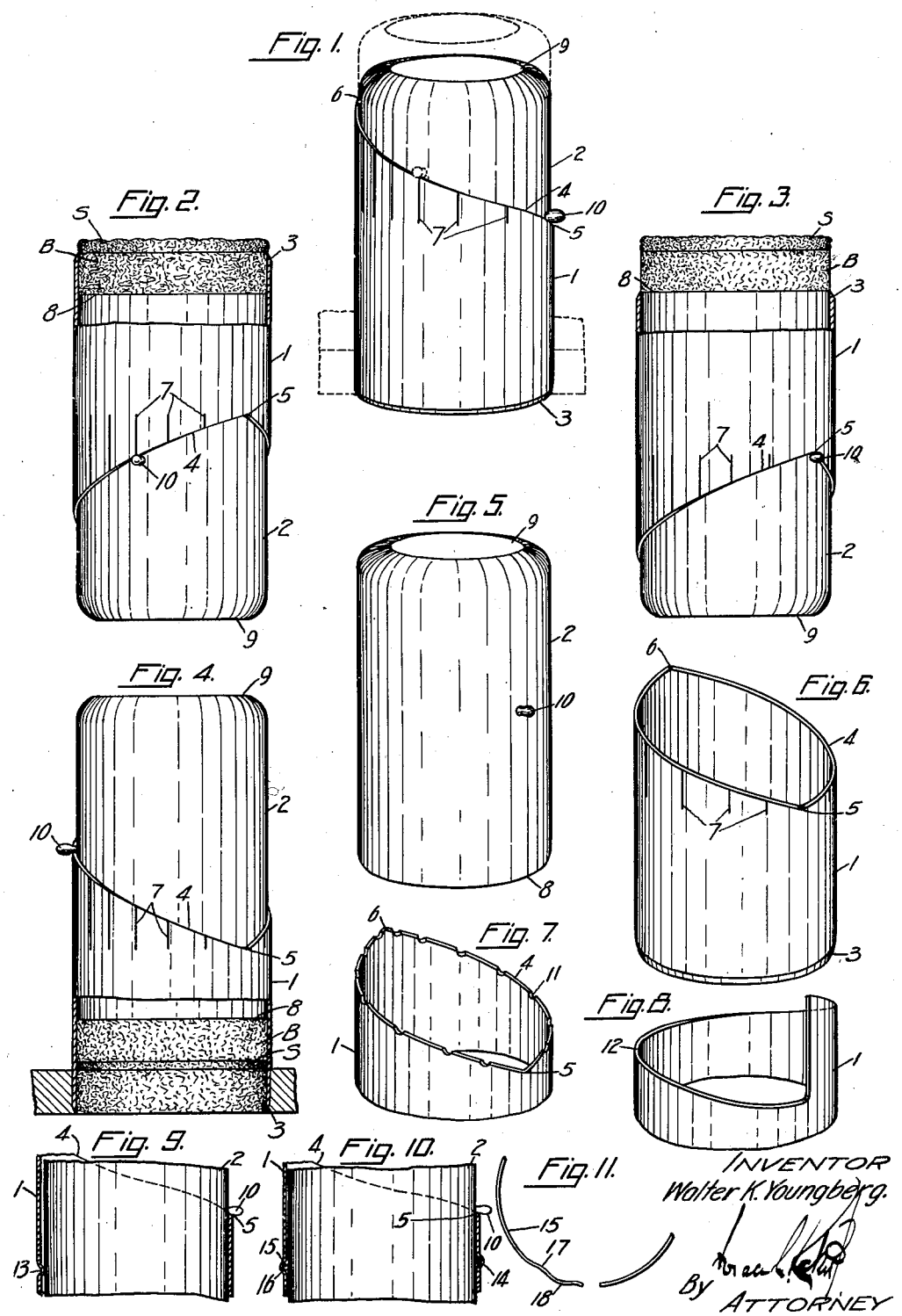

2,271,908

UNITED STATES PATENT OFFICE 2,271,908

CANAPE CUTTER

Walter K. Youngberg, Meriden, Conn.

Application January 5, 1939, Serial No. 249,544

17 Claims. (Cl. 30—130)

My invention relates to canape cutters.

It has among its objects to provide an improved canape cutter. A further object of my invention is to provide such an improved cutter which, while adapted to function satisfactorily and to produce a wide variety of canapes, is of markedly simplified construction and quickly and conveniently adjustable. Other objects of my invention are to provide such an improved construction having improved and quickly and readily adjustable means for predetermining the depth of cut over a wide range, and such improved means also adapted to hold the parts in their different positions of adjustment against telescoping during cutting and spreading of the bread, while enabling telescoping movement whenever desired to eject the cut bread therefrom. Still further objects are to provide such a cutter having the advantages set forth, which is also capable of being readily, quickly and completely cleansed and which, further, comprises a minimum number of simple, rugged and inexpensive parts and is also capable of being manufactured at small expense. These and other objects and advantages of my improved construction will, however, hereinafter more fully appear.

In the accompanying drawing, I have shown for purposes of illustration certain embodiments which my invention may assume in practice.

In the drawing:

Figure 1 is a perspective view of one form of my improved cutter, the ejector element being shown in full lines in its full down or non-cutting position and in dotted lines in process of cutting a single thickness of bread;

Fig. 2 is a side elevation of the construction shown in Figure 1 after cutting the bread, the device being in an inverted or bread spreading position with a spread canape therein;

Fig. 3 is a view similar to Figure 2 but showing the parts in ejecting position ready to permit manual removal of the completed canape;

Fig. 4 is a view similar to the dotted line position shown in Figure 1 but showing the parts in process of cutting the second thickness of a sandwich;

Fig. 5 is a perspective view of the adjustable ejector member per se;

Fig. 6 is a like view of the cutter member;

Fig. 7 is a detail of the upper end of a modified form of cutter member;

Fig. 8 is a like detail view but showing a further modified construction;

Fig. 9 is a detail sectional view of a modified construction embodying holding means;

Fig. 10 is a view similar to Figure 9 showing a further modified form of holding means, and Fig. 11 is a plan view of the holding spring shown in Figure 10.

Referring first to the construction shown in Figures 1 to 6, it will be noted that I have shown therein a cylindrical cutter element 1 and a co-operating ejector element 2 adjustably mounted therein, these elements or members each being of an improved construction and cooperating in an improved manner, as hereinafter described.

The cutter element or member 1, preferably formed of a shell of stainless steel, is provided with an external beveled cutting edge 3 on its bottom. Further, as shown, the same is preferably of uniform cylindrical cross section throughout its length, and is also free from fully or partially closed ends and from indentations or protuberances between its ends, all in such manner as thereby to permit the same to be readily, quickly and completely cleansed, both internally and externally. Attention here is also directed to the fact that the end of the member 1 which is remote from the cutting edge 3, is cut at an angle, in such manner as to provide an inclined cam track 4 on the edge of that end. Herein, each side of that end is cut in a helical path to produce a like helical cam track 4 on each half of this non-cutting end of the cutter 1. Further, it will be noted that the cam edges 4 have a low point 5 between them at one end thereof, while a point 6 of maximum height is provided between their opposite ends, herein at a diametrically opposite point. If desired, a series of marks or indications of suitable form, herein in the form of vertical lines 7, may also be provided on the outside of the cutter 1 in spaced relation around the same and below the cam tracks 4, these lines, for purposes hereinafter set forth, preferably each starting from a bottom point spaced from the cutting edge 3 by the same distance as that between the latter edge and the low point 5.

Cooperating with this improved cutter 1 is my improved ejector element or member 2. The latter herein is insertable through the open top of the cutter 1 and provides a combined adjustable ejector and grasping or handle member. As shown, this member is also cylindrical in form and of such diameter as to fit snugly in the member 1 and thus be maintained in any position of vertical adjustment in the latter, while also being free to be rotated therein, as desired.

In a preferred construction, this member 2 is made of a hard wood and solid, although, obviously, other materials may be used, particularly if it is desired to utilize a non-solid construction. As shown, this member 2 is also preferably of such length that when its lower end 8 is flush with the cutting edge 3, its upper end 9 projects a short distance beyond the high point 6 on the cutter 1, in such manner as to produce above the latter member an upper grasping portion or knob, preferably suitably rounded, as shown Moreover, it will be observed that this member 2 is provided intermediate its ends with a projecting cam, herein in the form of a pin 10 which is spaced from the bottom of the member 2 by substantially the same distance as the low point 5 on the cutter is spaced from the cutting edge 3, and which engages and rides over the cam tracks 4 in either direction while permitting the members 1 and 2 to be longitudinally separated whenever desired.

In the use of this construction, and with the elements 1 and 2 assembled as shown in Figure 1, it will be evident that, whenever desired, by simply turning the ejector member 2 about its axis relative to the cutter member 1, the pin 10 will be caused to travel up either cam track 4. Further, it will be evident that as the pin 10 is so moved, the member 2 will be raised, in such manner as thereby to raise the bottom of the member 8 above the cutting edge on the cutter 1 and thus adapt the device to use with bread of any desired thickness, while the bread is free from all pressure save that of the cutting edge 3. Thus, for example, if it is desired to cut out a circular piece from a slice of bread of the thickness shown in Figures 1, 2 and 3, the member 2 is turned until the pin 10 is opposite the third line from the right shown in Figure 1, i. e. until the bottom 8 of the member 2 is spaced above the cutting edge 3 of the cutter 1 by the same distance as the vertical length of the selected line 7. The user is thus able, by a glance at the lines 7, to locate the bottom 8 of the member 2 in any desired vertical relation to the cutting edge 3. Further, obviously, the pin 10 may be disposed in any desired position intermediate the lines, in such manner as to give an unlimited variation in the height of the bottom 8 between the bottommost point 5 and the topmost point 6.

With this vertical relation of the ejector 2 established as desired, the user then places the cutter 1 over the bread, and with a twisting motion in a direction tending to move the pin 10 up either cam track 4, rotates both the members 1 and 2, while depressing the same, in such manner as to cut through the bread, the cut portion thereof then being received in the cutter 1 below the raised bottom end 8 of the ejector. After this cutting operation, obviously the entire device may be readily turned sidewise in the hand, or, if desired, vertically as shown in Figure 3, in such manner as to expose the bottom of the slice of cut bread, indicated at B, and enable the exposed surface thereof to be covered with a coating of any suitable condiment or spread, indicated at S. Then, the cut and coated round piece of bread may be readily ejected if desired, by bringing about a relative movement between the members 1 and 2, in such manner as thereby to return the pin 10 to the low point 5, whereupon, as shown in Figure 3, the completed canape is completely exposed so that it may be readily lifted off. If, however, it is desired to make sandwiches or double thickness canapes comprising a plurality of thicknesses of bread, it will be evident that, instead of ejecting the first thickness of bread after spreading the same, the parts 1 and 2 again may be relatively angularly adjusted, in such manner as to raise the ejector 2 above the spread bread therein and bring the parts into the relation shown in Figure 4, ready to cut a second slice, which obviously may be cut, or cut and spread as heretofore described, and then ejected, as previously described.

As a result of my improved construction, it is thus possible to produce canapes or sandwiches having a single thickness of bread, or several thicknesses, as desired, and successively to form the complete canapes with marked facility. Further, it will be noted that, in any angular relation of the members 1 and 2, the same may be turned together, as by gripping both the members 1 and 2 with the fingers while the portion 9 is in the palm of the hand, or, if desired, both members 1 and 2 may be turned together by simply gripping and turning the upper portion 9 of the member 2, such a twisting movement of the pin 10 in a direction up either cam track 4 when accompanied by a downward pressure, bringing about the desired rotation of the cutter 1 and resultant cutting of the bread. Moreover, the parts are maintaned in each position of vertical adjustment without any conscious effort on the part of the user. They further remain in any selected position even when the hand is removed. It will also be noted that, if desired, by merely glancing at the location of the pin 10 on the cam track, it is possible to determine the height of the bottom 8 of the member 2 above the cutting edge 3 very quickly and readily without making it necessary to invert the cutter to see the actual vertical position of the member. The lines 7, if used, are also helpful in this connection, as when the pin 10 is opposite any selected line the depth of cut for which the parts are then adjusted is exactly equal to the length of the line directly under the pin. Attention is also directed to the fact that the construction is such as to permit ready and complete longitudinal separation of either of the members 1 and 2 from the other whenever desired. Each also is so constructed as obviously to be capable of being quickly and thoroughly cleansed when so separated. Due to the simplicity of the construction, it will also be evident that the same may be manufactured at small expense, while the structure is also obviously adapted to long use in service. In use, oval and crescent shaped canapes may also be produced in a usual manner from completed round canapes by again cutting the same with the cutter in a manner usual in canape cutters, the member 2 then, of course, being adjusted high enough so that its bottom 8 does not come in contact with the spread on the upper surface of the canape being cut.

If desired, in order even more definitely to locate the pin 10 in certain of its positions, suitably spaced notches 11 may be provided in the cam tracks 4, as indicated in Figure 7. Further, it will be evident that, if desired, these cam tracks may assume different forms, as, for example, the elongated or single continuous form shown at 12 in Figure 8, although two like cam tracks 4, shown in Figure 6, are preferred, since this construction enables the desired adjustment to be obtained, irrespective of the direction of rotation of the pin 10 from the low point 5. Although not preferred, in view of the satisfactory fit obtainable between the cylindrical members 1 and 2, I may, if desired, also provide holding means between these elements. For example, a round punched-in portion 13 may be provided in the member 1, this punched-in portion preferably being provided at a point diametrically opposite the low point 5, but somewhat nearer the cutting edge, as, for example, illustrated in Figure 9; this projection 13, which thus is always in contact with a side wall of the member 2, being adapted to maintain the latter member in the desired relation to the cutter 1 even if the members 1 and 2 are not of the proper diameter. A further modified form of holding means, which may be used if desired, is also shown in Figures 10 and 11, wherein an outwardly deflected annular bead 14 is provided in the member 1 and extended around the latter in the same location as the projection 13, a suitable spring 15 also being disposed in the resultant inside groove 16. As shown, this spring 15 is in the form of a single length of wire having an inwardly bent portion 17 and an outwardly bent portion 18 extending into the groove, this construction also being such that the portion 17 is always in contact with the side of the member 1.

While I have in this application specifically described certain forms of my invention, it will be understood that these forms of the same are shown for purposes of illustration, and that the invention may be modified and embodied in other forms without departing from its spirit or the scope of the appended claims.

What I claim as new and desire to secure by Letters Patent is:

1. In a canape cutter, a cutter element, an ejector element therein, and means operative upon relative rotative movement of said elements for adjusting the same longitudinally relative to one another to vary the depth of cut while holding the same against telescoping movement during cutting.

2. In a canape cutter, a cutter element open at both ends, an ejector element therein, and means operative upon relative rotative movement of said elements for moving the same longitudinally relative to one another to vary the depth of cut while holding the same against telescoping movement during cutting and maintaining the same free for longitudinal separating movement in a reverse direction.

3. In a canape cutter, a cutter element, an ejector element therein, and means on said elements operative upon relative movement thereof for adjusting said elements vertically relative to one another, including a cam track on one element and a cooperating cam element on the other element, said cam track having notches therein and said cooperating cam element being receivable in said notches.

4. In a canape cutter, a tubular cutter element open at both ends, an ejector element therein, and cam means for adjusting the same vertically relative to one another including a cam track on the non-cutting edge of said cutter element and a cooperating cam element intermediate the ends of said ejector element.

5. In a canape cutter, a cutter element, an ejector element vertically adjustable inside the latter, and cooperating means on said elements for maintaining said ejector element in different longitudinal positions relative to said cutter element including engaging portions on said elements relatively longitudinally adjusting the latter upon rotation of one of said elements relative to the other.

6. In a canape cutter, a cutter element, an ejector element inside the latter, and cooperating relatively rotatable means on said elements for adjusting said ejector element longitudinally relative to said cutter element upon relative rotation of said elements including peripherally located engaging portions supporting said ejector element in different longitudinal and angular positions relative to said cutter element.

7. In a canape cutter, a cutter element having an open top, an ejector element insertable therein through said top, and connections between said elements for enabling relative longitudinal adjustment while maintaining the same against relative longitudinal movement during cutting.

8. In a canape cutter, a tubular cutter element having an open top, an ejector element insertable therein through said top, and connections between said elements for enabling relative longitudinal adjustment and maintaining the same against relative longitudinal movement during cutting, said ejector element comprising an elongated plug member substantially filling the cutting end of said tubular member and having a grasping portion receivable in the palm of the hand while the fingers grasp said tubular member.

9. In a canape cutter, a cutter element having an open top, an ejector element insertable therein through said top and having a grasping portion above the latter, and connections between said elements for effecting adjustment of said ejector element into different longitudinal positions relative to said cutter element including means for holding said elements in different positions of adjustment.

10. In a canape cutter, a cutter element having an open top, an ejector element insertable therein through said top and having a grasping portion above the latter, connections between said elements for effecting adjustment of said ejector element into different longitudinal positions relative to said cutter element, and supplementary means acting between said elements for holding the same in different positions of adjustment.

11. In a canape cutter, a cutter member carrying a cutting edge on one end and having a cam track longitudinally spaced from said end, and an ejector member having one end in said cutter member and having a projecting grasping portion on its opposite end and a cam portion between its ends cooperating with said cam track.

12. In a canape cutter, a cylindrical cutter shell having a cutting edge on one end and a cam track on its other end, and an ejector member having one end receivable in said shell and having a laterally projecting cam portion between its ends engageable with said cam track and also having a projecting grasping portion on its opposite end, said shell and ejector member being freely separable longitudinally.

13. In a canape cutter, a cylindrical cutter shell having a cutting edge on one end and a cam track on its other edge, and an ejector member having one end receivable in said shell and having a laterally projecting cam portion engageable with said cam track and also having a projecting grasping end, said cam track comprising oppositely located inclined portions each having adjacent high points and adjacent low points, and said laterally projecting cam portion being movable in either direction along either cam track.

14. In a canape cutter, a tubular cutter element, an ejector element receivable therein, cooperating means on said elements for effecting relative longitudinal adjustment of the same upon relative rotation thereof, and means carried by one element and engaging the side of the other element for maintaining said elements in different longitudinal positions.

15. In a canape cutter, a tubular cutter element, an ejector element receivable therein, cooperating means on said elements for effecting relative longitudinal adjustment of the same upon relative rotation thereof and means for maintaining said elements in different longitudinal positions, including a punched-in portion on the cutter element intermediate the ends thereof and engaging the side of the ejector element.

16. In a canape cutter, a tubular cutter element, an ejector element receivable therein, cooperating cam means on said elements for effecting relative longitudinal adjustment of the same, and means for maintaining said elements in different longitudinal positions including a spring element carried by the cutter element and engaging the side of the ejector element.

17. In a canape cutter, a tubular cutter element, an ejector element receivable therein, cooperating cam means on said elements for effecting relative longitudinal adjustment of the same, and means for maintaining said elements in different longitudinal positions including a spring ring seated in said cutter element intermediate its ends and having a portion engaging the side of the inner wall of said ejector element.

WALTER K. YOUNGBERG.